United States Patent [19]
Sakuma

[11] 3,771,222
[45] Nov. 13, 1973

[54] APPARATUS FOR CUTTING AND CORE-STRIPPING AN ELECTRIC CORD

[76] Inventor: Yuuko Sakuma, 10-9 Kiribatake, Kanagawa-ku, Yokohama, Japan

[22] Filed: Dec. 9, 1971

[21] Appl. No.: 206,265

[30] Foreign Application Priority Data
Sept. 11, 1971 Japan.................................. 46/70783

[52] U.S. Cl............................ 30/90.1, 30/28, 7/5.5, 30/145, 30/176
[51] Int. Cl............................................ H02g 1/12
[58] Field of Search ......................... 81/9.5 B, 9.5 R; 30/90.1, 28, 91.2, 176, 187, 189, 142, 145; 7/5.5

[56] References Cited
UNITED STATES PATENTS

| | | | |
|---|---|---|---|
| 1,349,563 | 8/1920 | Day | 30/176 |
| 847,980 | 3/1907 | Bowler | 30/189 |
| 1,329,226 | 1/1920 | Cervenka | 81/9.5 B |
| 2,279,068 | 4/1942 | Siebrandt | 81/43 |
| 1,490,459 | 4/1924 | Fergusson | 81/9.5 B |
| 2,609,716 | 9/1952 | Forman | 30/91.2 |
| 2,894,424 | 7/1959 | Vaughan, Sr. | 81/9.5 R |
| 1,131,473 | 3/1915 | Courtney | 30/91.2 |

Primary Examiner—Granville Y. Custer, Jr.
Assistant Examiner—Roscoe V. Parker
Attorney—Richard C. Sughrue et al.

[57] ABSTRACT

An apparatus for the cutting and core-stripping of an electric cord comprising a cutter having circular openings formed in the contact portions of its cutting edges to cut cords. The openings are provided with cutting edges to strip the cords and take out inner core. A bevel head rivet functions as a fulcrum of a lever that is placed near the center of the transverse width of upper and lower leaf springs. Both springs are cut to form T - shaped or I - shaped cutters.

1 Claim, 3 Drawing Figures

PATENTED NOV 13 1973　　　　　　　　　3,771,222

APPARATUS FOR CUTTING AND CORE-STRIPPING AN ELECTRIC CORD

FIELD OF THE INVENTION

This invention relates to an apparatus for cutting or core-stripping of an electric cord or the like wherein the cutting and the stripping of the cord to expose the core are effectively performed.

PRIOR ART

In the prior art, an apparatus for cutting and stripping a cord to take out the inner core thereof by the use of a nail nipper-like cutter has been used, the side width of a leaf spring in the cutter has been widen and the position of a bevel head rivet has been displaced to one side in order to provide a portion for cutting the cord or the like and removing the coating to strip the cord. An opening is provided on the surface of the leaf spring through which the cord is taken out to pull out the cut core of the cord.

In this case, however, the displacement of the bevel head rivet to one side tends to make cutting difficult because of the ununiform pressure being applied to the contacting edges when the cord is cut by the exerting force upon the lever. The width of the nail nipper-like cutter is made wider in order to create a portion to cut and strip the cord to take out the inner core so that a great force, applied to the lever is necessary.

SUMMARY AND OBJECTS OF THE PRESENT INVENTION

This invention provides improvements to the apparatus for cutting and stripping an electric cord and eliminates those disadvantages in which the bevel-head rivet acts as a fulcrum of the lever and is placed near the central position of the wide portion of the leaf spring and on the both sides thereof. The portion to cut the cord and to strip the cord for taking out the inner core are separately placed so that no clearance is produced between the opposite cutting edges due to the uniform application of force thereto. Both edges of the upper and lower leaf springs of the nail nipper-like cutter are cut off to form a T-shaped or I-shaped configuration so that the width of the cutter becomes in part narrower to make it flexible thereby permitting the use of a smaller necessary force upon the lever. Two openings are formed by cutting off both side edges thus enabling the cord or the like to be easily removed therefrom. The cord can be inserted from the cut portion into the openings or vice versa.

It is a broad object of the present invention to provide an apparatus for cutting and stripping an electric cord, in which the bevel head rivet acting as a fulcrum for the lever is positioned on the longitudinal center line of the leaf spring and the cord cutting and stripping portions are separately placed.

Another object of the present invention is to provide such apparatus, in which no clearance is produced between the opposite cutting edges due to the uniform application of force thereto, and the side edges of the upper and lower leaf springs of the nail nipper-like cutter are cut off to form a T-shaped or I-shaped configuration so that the width of the cutter becomes in part narrower to make it flexible.

BRIEF DESCRIPTION OF THE DRAWING

The accompanying drawing shows an embodiment of an apparatus according to this invention.

DETAILED EXPLANATION OF THE ILLUSTRATED EMBODIMENT

Figure 1:
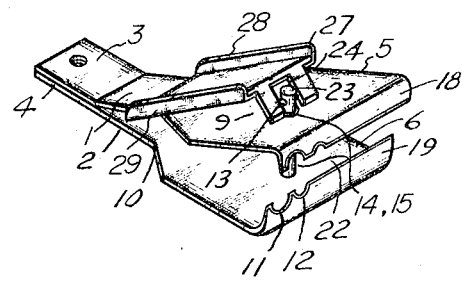
FIGS. 1, 2 and 3 illustrate an embodiment of the present method for cutting cords or the like, showing the cutting steps respectively.
Figure 2:
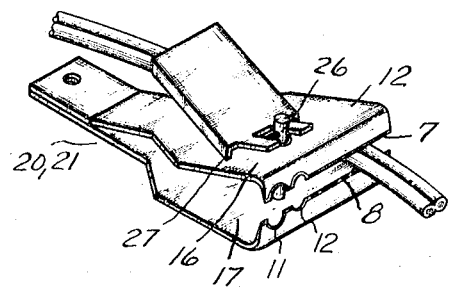
Figure 3:
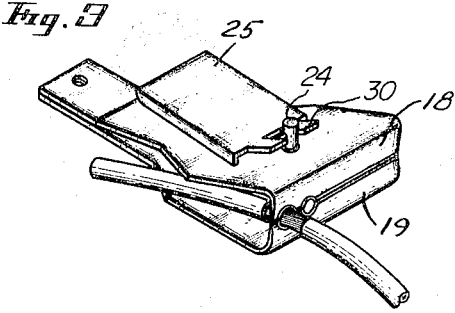

With reference to the accompanying drawing, the apparatus embodying this invention will be explained in detail hereinafter.

In a nail nipper-like cutter of two leaf springs having an upper leaf spring (1) and a lower leaf spring (2), one bent end (3) of the leaf spring (1) is welded such as by a solder joint method to the other end (4) of the leaf spring (2) so as to join the leaf spring (1) to the leaf spring (2) in a wedge shape. At both ends (5, 6) opposite to these ends (3, 4) of the leaf springs (1, 2), the end portions of the leaf springs (1, 2) are inwardly bent and cutting edges are formed therein.

In the back portion of the ends (5) (6) recesses (9) (10) are provided. In the cutting edges (7) (8) of the end portions openings are formed, which openings are made so as to be circles when the edges are placed in contact with each other. Each diameter of the openings are respectively about 1.5 mm and about 1.0 mm.

Truncated core shape holes or openings 11, 12 are bored from the surfaces of the cutting edges (7) (8) in the contact position whereby the cutting edges of the circular holes are provided in the circumferential portion thereof.

The side or transverse width of the leaf springs (1) (2) is made wider than that of the nail nipper-like cutter in order to obtain a portion for cutting cords or the like and stripping them to take out the inner core. Holes (14) (15) through which the bevel head rivet (13) is inserted are formed near the center line of the transverse width in the surface of the leaf springs. The surface of the leaf spring is divided with respect to the holes (14) (15) into two portions (16) (17) and (18) (19) in such a manner that the portion (16) (17) is provided with the circular cutting edged openings (11) (12) on the edges (7) (8) of the end of the portion (16) (17), while the other portion (18) (19) is equipped with the cutting edges to cut cords. The surfaces of the leaf spring are cut along the side edges thereof to form openings or spaces (20) (21) whereby T-shaped or I-shaped leaf spring obtained. The ends (3) (4) of the leaf spring (1) (2) are welded, for example, by means of a solder joint so that the openings (22) are made in wedge like manner. The openings or spaces (20) (21) are formed on the surfaces of the leaf spring with such a width that cords or the like inserted into the openings (22) can be easily removed.

The bevel head rivet (13) is inserted through the hole (15) of the leaf spring (12) to the hole (14) of the leaf spring (1).

The portion (24) of the bevel head rivet has a fulcrum (26) to fit or pin-connect with the fulcrum (27) of a lever (25). The lever (25) possesses the fulcrum (27) in its end portion thereof which fits or pin-connects with the fulcrum (26) of the bevel head rivet.

Side edges of the lever (25) are bent to form projections (28) (29) which enable the cutting edges to make contact with each other by the application of pressure through these projections. An end portion having the fulcrum (27) of the lever (25) is bent so as to form a support (30) of the lever (25).

As shown in FIG. 4, cords are cut at any desired position by inserting the cords from the openings (22) into the end portions having the cutting edges, taking them out from other openings (20) (21), moving them and operating the lever (25) to apply pressure on the leaf spring (2) by means of the leaf spring (1) to make the cutting edge (7) contact the other edge (8). When the cords are inserted through the openings (11) and (12) having the cutting edges which are provided in the cutting edges (7) (8), and taken out from the opening (20) (21) and the lever (25) is operated to apply pressure on the leaf spring (1) to make contact with them, the coating portions of the cords are cut off through the cutting edges with the exception of the inner core whereby the desired length cords having the exposed inner core in the end portion thereof can be obtained by pulling out the cut cords.

As described above, this invention provides a nail nipper shaped cutter in which a bevel head revet functioning as a fulcrum is placed near the center live of the transverse width of the leaf spring. A portion to cut cords and a portion to strip cords and take out the inner core thereof are provided respectively on both sides of the rivet, and both side edges of the upper and lower leaf springs in the cutter are cut off to form generally a T-shaped or I-shaped configuration and thereby provide a narrower transverse width with openings in the both sides thereof, whereby uniform force can be exerted upon the cutting edge. One cutting edge is brought into contact with the other one without producing clearance therebetween upon exerting a force on the lever so that it becomes easy to cut. In each side of the bevel head rivet, cutting the cords and stripping them to take out the inner core can separately be performed and the portions for cutting and stripping the cords are placed on the wide cutting edges of the upper and lower leaf spring so that it is impossible to bend the leaf springs unless a great force is applied. In order to make the leaf springs flexible, both side edges of the leaf springs are cut off, therefore the leaf springs can be bent easily to contact the cutting edges with each other.

In this way, the cords inserted from the openings in the cutting edges of the leaf springs can be taken out from the openings in the side edges of the springs to perform effectively the operations of cutting and stripping cords.

What I claim is:

1. An apparatus for severing electric wires and for stripping insulation from such wires, comprising:
    a. a pair of flexible metal members each being relatively wide at one end and relatively narrow at the other, opposite end,
    b. means rigidly securing the narrow ends of the members together in a flat, overlying relationship,
    c. one of the members being bent intermediate its ends such that the wide ends of the two members diverge,
    d. the wide ends of the two members being inwardly bent towards each other at approximately a 90° angle and having sharpened edges to define mating cutting edges to implement wire cutting,
    e. a plurality of mating, semi-circular cutouts provided at one end of the cutting edges to implement insulation stripping,
    f. a post rigidly secured to the interior side of one of the members near the cutting edge bend and extending through a hole in the other member,
    g. a generally rectangular lever plate having two bent fingers extending from one end thereof,
    h. means pivotally mounting the extended end of the post between the fingers,
    i. the opposite ends of the lever plate on either side of the fingers bent in a direction away from the fingers at an angle of approximately 90° and the width of the lever plate being greater than the width of the narrow ends of the members, and
    j. the bent sides of the lever plate providing spaced fulcrum corners which bear against the other member and urge the cutting edges together when the end of the lever plate opposite the fingers is pressed towards the said one of the members, whereby the spaced fulcrums provide a uniform force across the cutting edges regardless of where a wire to be stripped or cut is inserted.

* * * * *